(12) United States Patent
Sivaraj et al.

(10) Patent No.: US 11,671,351 B2
(45) Date of Patent: Jun. 6, 2023

(54) MAINTAINING A SET OF LINKS ASSOCIATED WITH A LINK AGGREGATION GROUP TO FACILITATE PROVISIONING OR UPDATING OF A CUSTOMER EDGE DEVICE

(71) Applicant: Juniper Networks, Inc., Sunnyvale, CA (US)

(72) Inventors: SelvaKumar Sivaraj, Sunnyvale, CA (US); Sushant Kumar, Bangalore (IN); Bharat M. Gaonkar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 141 days.

(21) Appl. No.: 17/112,415

(22) Filed: Dec. 4, 2020

(65) Prior Publication Data

US 2022/0182311 A1 Jun. 9, 2022

(51) Int. Cl.
*H04L 45/24* (2022.01)
*H04L 45/00* (2022.01)
*H04L 45/28* (2022.01)

(52) U.S. Cl.
CPC ............ *H04L 45/245* (2013.01); *H04L 45/22* (2013.01); *H04L 45/28* (2013.01); *H04L 45/66* (2013.01)

(58) Field of Classification Search
CPC ....... H04L 45/245; H04L 45/22; H04L 45/28; H04L 45/66
See application file for complete search history.

(56) References Cited

U.S. PATENT DOCUMENTS

| | | |
|---|---|---|
| 8,243,594 B1 | 8/2012 | Fotedar et al. |
| 9,013,986 B2 | 4/2015 | Yu et al. |
| 10,270,686 B2 | 4/2019 | Saltsidis et al. |
| 2009/0232152 A1 | 9/2009 | Chen |
| 2017/0141963 A1* | 5/2017 | Chalapathy ............ H04L 41/12 |
| 2019/0052559 A1 | 2/2019 | Velayudhan |

(Continued)

FOREIGN PATENT DOCUMENTS

| CN | 101984606 A | 3/2011 |
|---|---|---|
| CN | 103534985 A | 1/2014 |

(Continued)

OTHER PUBLICATIONS

Extended European Search Report for Application No. EP21153509.1, dated Jul. 27, 2021, 6 pages.

*Primary Examiner* — Donald L Mills
(74) *Attorney, Agent, or Firm* — Harrity & Harrity, LLP

(57) ABSTRACT

In some implementations, a provider edge device associated with a link aggregation group (LAG) may maintain, according to a link aggregation control protocol (LACP), a set of links that connect the PE device to a consumer edge device. The provider edge device may determine that the provider edge device and another provider edge device associated with the LAG are not receiving link aggregation control protocol data units (LACPDUs) from the consumer edge device. The provider edge device may cause the set of links to have a maintain LAG status, which causes the provider edge device to keep up the set of links and to cease maintaining the set of links according to the LACP. The provider edge device may route, based on causing the set of links to have the maintain LAG status, one or more packets to or from the consumer edge device via the set of links.

20 Claims, 11 Drawing Sheets

(56) References Cited

U.S. PATENT DOCUMENTS

| | | |
|---|---|---|
| 2019/0132152 A1 | 5/2019 | Wang et al. |
| 2020/0092200 A1* | 3/2020 | Velayudhan ............ H04L 45/22 |
| 2020/0244486 A1* | 7/2020 | Wang ...................... H04L 45/64 |
| 2022/0021556 A1* | 1/2022 | Kreger-Stickles .... H04L 45/586 |

FOREIGN PATENT DOCUMENTS

| | | |
|---|---|---|
| CN | 105122749 A | 12/2015 |
| CN | 107465613 A | 12/2017 |

* cited by examiner

500 ⟶

510 — Maintain, by a provider edge device associated with a link aggregation group (LAG) and according to a link aggregation control protocol (LACP), a set of links that connect the provider edge device to a consumer edge device associated with the LAG 520 — Determine, by the provider edge device, that the provider edge device is not receiving link aggregation control protocol data units (LACPDUs) from the consumer edge device via the set of links 530 — Receive, by the provider edge device, a message from another provider edge device associated with the LAG 540 — Process the message to determine that the other provider edge device is not receiving LACPDUs from the consumer edge device 550 — Cause, by the provider edge device, and based on determining that the provider edge device is not receiving LACPDUs from the consumer edge device and determining that the other provider edge device is not receiving LACPDUs from the consumer edge device, the set of links to have a maintain LAG status 560 — Route, by the provider edge device and based on causing the set of links to have the maintain LAG status, one or more packets to or from the consumer edge device via the set of links

FIG. 5

MAINTAINING A SET OF LINKS ASSOCIATED WITH A LINK AGGREGATION GROUP TO FACILITATE PROVISIONING OR UPDATING OF A CUSTOMER EDGE DEVICE

BACKGROUND

An Ethernet virtual private network (EVPN) enables a group of dispersed customer sites to be connected using a Layer 2 virtual bridge. A virtual extensible local area network (VXLAN) allows connectivity over an intervening Layer 3 network, while providing network segmentation like virtual local area network (VLAN). An EVPN-VXLAN supports Layer 2/Layer 3 network connectivity.

SUMMARY

In some implementations, a method includes maintaining, by a provider edge device associated with a link aggregation group (LAG) and according to a link aggregation control protocol (LACP), a set of links that connect the provider edge device to a consumer edge device associated with the LAG; determining, by the provider edge device, that the provider edge device is not receiving link aggregation control protocol data units (LACPDUs) from the consumer edge device via the set of links; receiving, by the provider edge device, a message from another provider edge device associated with the LAG; processing the message to determine that the other provider edge device is not receiving LACPDUs from the consumer edge device; causing, by the provider edge device, and based on determining that the provider edge device is not receiving LACPDUs from the consumer edge device and determining that the other provider edge device is not receiving LACPDUs from the consumer edge device, the set of links to have a maintain LAG status, wherein causing the set of links to have the maintain LAG status causes the provider edge device to keep up the set of links and to cease maintaining the set of links according to the LACP; and routing, by the provider edge device and based on causing the set of links to have the maintain LAG status, one or more packets to or from the consumer edge device via the set of links.

In some implementations, a provider edge device includes one or more memories and one or more processors to: determine that the provider edge device is not receiving LACPDUs from a consumer edge device via a set of links associated with a LAG that connect the provider edge device to the consumer edge device; receive a message from another provider edge device associated with the LAG; process the message to determine that the other provider edge device is not receiving LACPDUs from the consumer edge device; cause, based on determining that the provider edge device is not receiving LACPDUs from the consumer edge device and determining that the other provider edge device is not receiving LACPDUs from the consumer edge device, the set of links to have a maintain LAG status; route, based on causing the set of links to have the maintain LAG status, one or more packets to or from the consumer edge device via the set of links; determine, after routing the one or more packets to or from the consumer edge device via the set of links, that the provider edge device or the other provider edge device is receiving LACPDUs from the consumer edge device; and cause, based on determining that provider edge device or the other provider edge device is receiving LACPDUs from the consumer edge device, the set of links to cease having the maintain LAG status.

In some implementations, a non-transitory computer-readable medium storing a set of instructions includes one or more instructions that, when executed by one or more processors of a provider edge device, cause the provider edge device to: determine that the provider edge device and another provider edge device are not receiving LACPDUs from a consumer edge device, wherein the provider edge device is connected to the consumer edge device via a first set of links of a LAG, and wherein the other provider edge device is connected to the consumer edge via a second set of links of the LAG; cause, based on determining that the provider edge device and the other provider edge device are not receiving LACPDUs from the consumer edge device, the first set of links to have a maintain LAG status; determine, after causing the first set of links to have a maintain LAG status, that at least one of the provider edge device or the other provider edge device is receiving LACPDUs from the consumer edge device; and cause, based on determining that at least one of the provider edge device or the other provider edge device is receiving LACPDUs from the consumer edge device, the first set of links to cease having the maintain LAG status.

BRIEF DESCRIPTION OF THE DRAWINGS

FIGS. 5-7 are flowcharts of example processes relating to maintaining a set of links associated with a LAG to facilitate provisioning or updating of a customer edge device.

DETAILED DESCRIPTION

Figure 1A:
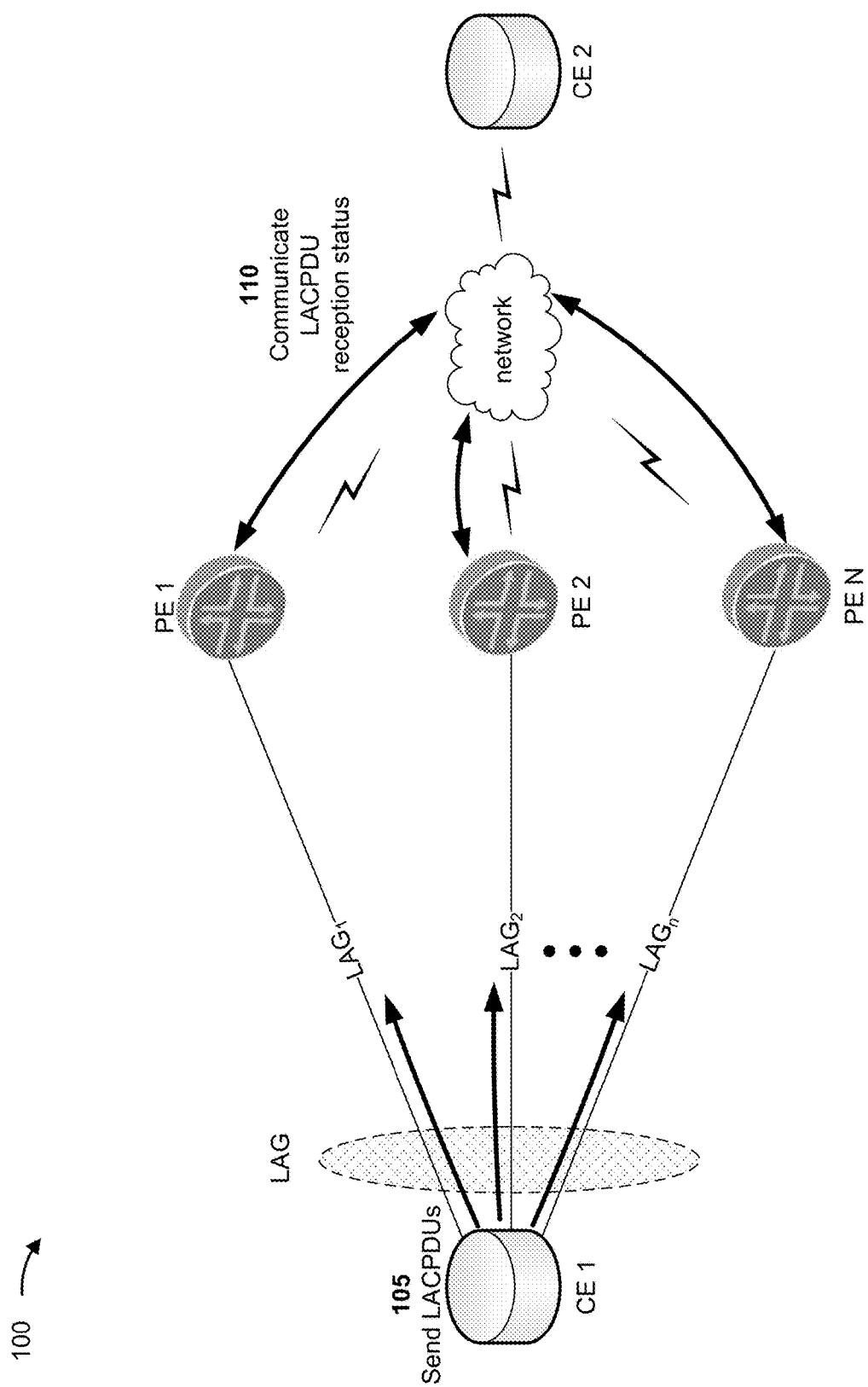
FIGS. 1A-1E are diagrams of an example implementation described herein.

The following detailed description of example implementations refers to the accompanying drawings. The same reference numbers in different drawings may identify the same or similar elements.

A network, such as an EVPN, a VXLAN, and/or an EVPN-VXLAN, enables a group of dispersed customer sites to be connected using a Layer 2 virtual bridge and/or a Layer 3 underlay. The network may include customer edge devices connected to provider edge devices that route traffic to and from the customer edge devices.

In a multi-homed scenario, a customer edge device is connected to two or more provider edge devices that provide redundancy and network service to the customer edge device. The customer edge device is connected to the two or more provider edge devices by a plurality of links (e.g., a first group of links that connect the customer edge device to a first provider edge device, a second group of links that connect the customer edge device to a second provider edge device, and/or the like) that form a link aggregation group (LAG). According to the link aggregation control protocol (LACP), the customer edge device sends link aggregation control protocol data units (LACPDUs) to the two or more provider edge devices via the plurality of links to cause the two or more provider edge devices to maintain (e.g., keep up) the plurality of links and therefore maintain the LAG.

In some cases, the customer edge device undergoes a provisioning or updating process that requires the customer edge device to shut down and/or reboot. During this process, the customer edge device ceases sending the LACPDUs to the two or more provider edge devices via the plurality of links. This often causes the two or more provider edge devices to cease maintaining the plurality of links, which therefore causes the links to be torn down because the two or more provider edge devices are no longer receiving LACPDUs. Consequently, the customer edge device is no longer connected to the two or more provider edge devices and therefore is unable to communicate with the network to obtain, from another customer edge device on the network, one or more file images that are needed by the customer edge device to complete the provisioning or updating process.

In some cases, the two or more provider edge devices may be manually configured (e.g., by a network administrator) to maintain the plurality of links while the customer edge device undergoes the provisioning or updating process, but this can be a resource intensive, time-consuming process that is susceptible to human error. For example, failing to remove the manual configuration after the customer edge device completes the provisioning or updating process may allow the plurality of links to be maintained, even when the customer edge device, the two or more provider edge devices, and/or the plurality of links are experiencing performance issues. This can result in communication failure, packet data loss, traffic blackholing, and/or the like.

Some implementations described herein provide a provider edge device associated with a LAG that maintains, according to the LACP, a set of links that connect the provider edge device to a consumer edge device associated with the LAG. The provider edge device determines that the provider edge device is not receiving LACPDUs from the consumer edge device via the set of links. The provider edge device determines, based on a message from another provider edge device associated with the LAG, that the other provider edge device is not receiving LACPDUs from the consumer edge device. Accordingly, the provider edge device causes the set of links to have a maintain LAG status, which causes the provider edge device to keep up the set of links and to cease maintaining the set of links according to the LACP. The provider edge device routes one or more packets to or from the consumer edge device via the set of links (e.g., while the set of links has the maintain LAG status).

In some implementations, the provider edge device determines, after routing the one or more packets to or from the consumer edge device via the set of links, that the provider edge device or the other provider edge device is receiving LACPDUs from the consumer edge device. Accordingly, the provider edge device causes the set of links to cease having the maintain LAG status, which causes the provider edge device to cease keeping up the set of links and to maintain the set of links according to the LACP.

In this way, the provider edge device described herein automatically maintains a set of links associated with a LAG to facilitate provisioning or updating of a customer edge device. Accordingly, this allows for a customer edge device to communicate with another customer edge device via a set of links of the provider edge device that are associated with the LAG to allow the customer edge device to complete a provisioning or updating process. This reduces a need for manually configuring the provider edge device, as well as other provider edge devices associated with the LAG, and therefore conserves computing resources (e.g., processing resources, memory resources, communication resources, and/or power resources, among other examples) of a device (e.g., a client device) that would otherwise be needed to manually configure the provider edge device and the other provider edge devices. Further, this reduces a likelihood of human error or other network misconfiguration issues from being introduced into a network associated with the provider edge device. This prevents at least some communication failure, packet data loss, traffic blackholing, and/or the like, that would otherwise occur using manual configuration. Accordingly, the provider edge device can improve a performance of the provider edge device, other provider edge devices associated with the LAG, the customer edge device, and/or the network.

FIGS. 1A-1E are diagrams of an example implementation 100 associated with maintaining a set of links associated with a LAG to facilitate provisioning or updating of a customer edge device. As shown in FIGS. 1A-1E, example implementation 100 includes multiple customer edge devices (e.g., shown as customer edge devices CE 1 and CE 2) and multiple provider edge devices (e.g., shown as provider edge devices PE 1 through PE N, where N≥2). These devices are described in more detail below in connection with FIGS. 2-4.

As shown in FIG. 1A, the customer edge device CE 1 may be connected to provider edge devices PE 1 through PE N. The customer edge device CE1 may be connected to the provider edge devices PE 1 through PE N by a plurality of links, such as Gigabit Ethernet (ge) links. The customer edge device CE 1 may aggregate the plurality of links via a LAG to share traffic among the plurality of links and to enhance connection reliability. For example, the customer edge device CE1 may bundle the plurality of links using an aggregation protocol, such as the Link Aggregation Control Protocol (LACP) (e.g., in active mode or passive mode). As shown in FIG. 1A, the customer edge device CE 1 may be connected to the provider edge device PE 1 via a set of links $LAG_1$ (e.g., comprising one or more links), may be connected to the provider edge device PE 2 via a set of links $LAG_2$ (e.g., comprising one or more links), and/or may be connected to the provider edge device PE N via a set of links $LAG_N$ (e.g., comprising one or more links), where the set of links $LAG_1$ through $LAG_N$ are associated with the LAG.

As shown in FIG. 1A, the provider edge devices PE 1 through PE N may be connected to a network (e.g., an EVPN, a VXLAN, or an EVPN-VXLAN, among other examples). In this way, the customer edge device CE1 may be multi-homed with provider edge devices PE 1 through PE N over the network. As further shown in FIG. 1A, the customer edge device CE 2 may be connected to the network. The customer edge device CE 1 may communicate with the customer edge device CE 2 via the LAG (e.g., via the sets of links $LAG_1$ through $LAG_N$), via the provider edge devices PE 1 through PE N, and via the network.

As further shown in FIG. 1A, and by reference number 105, the customer edge device CE 1 may send LACPDUs (e.g., according to the LACP) to the provider edge devices PE 1 through PE N (e.g., to maintain the sets of links $LAG_1$ through $LAG_N$ that comprise the LAG). For example, the customer edge device CE 1 may send LACPDUs to the provider edge device PE 1 via the set of links $LAG_1$ to maintain the set of links $LAG_1$, may send LACPDUs to the provider edge device PE 2 via the set of links $LAG_2$ to maintain the set of links $LAG_2$, and/or may send LACPDUs to the provider edge device PE N via the set of links $LAG_N$ to maintain the set of links $LAG_N$.

When a provider edge device receives an LACPDU from the customer edge device CE 1 via a set of links associated with the LAG and the provider edge device, the provider edge device may update (e.g., according to the LACP) a data structure (e.g., a database, an electronic file structure, and/or an electronic file, among other examples) to indicate that the set of links have an "active" status. For example, when the provider edge device PE 1 receives an LACPDU via a link of the set of links $LAG_1$, the provider edge device PE 1 may update an entry of a data structure (e.g., that is included and/or accessible to the provider edge device PE 1) that is associated with the set of links $LAG_1$ to indicate that the set of links $LAG_1$ has an "active" status. Accordingly, a provider edge device may maintain a set of links associated with the LAG (e.g., "keep up" the set of links) when the set of links has an active status. For example, the provider edge device PE 1, based on determining that an entry of the data structure indicates that the set of links $LAG_1$ has an active status, may maintain the set of links $LAG_1$.

As further shown in FIG. 1A, and by reference number 110, the provider edge devices may communicate with each other to indicate a respective "LACPDU reception status" of the provider edge devices. An LACPDU reception status of a provider edge device may indicate whether the provider edge device is receiving LACPDUs (e.g., whether the provider edge device is actively receiving LACPDUs) from the customer edge device CE 1 via a set of links associated with the LAG and the provider edge device. For example, the LACPDU reception status may indicate whether the provider edge device received an LACPDU within a particular time interval (e.g., the previous 10 seconds, the previous 30 seconds, or the previous 60 seconds, among other examples).

In some implementations, a provider edge device associated with a LAG may generate and send respective messages to other provider edge devices associated with the LAG. A message may indicate the LACPDU reception status of the provider edge device. In some implementations, a message may be an Ethernet segment route message. The provider edge device may generate and send the message on a scheduled basis (e.g., every 10 seconds, every 30 seconds, or every 60 seconds, among other examples), on a triggered basis (e.g., when the LACPDU reception status changes), and/or on an on-demand basis (e.g., based on a request from another provider edge device), among other examples.

The provider edge device may send a message to another provider edge device associated with the LAG via the network. For example, the provider edge device may send the message via a link of the provider edge device that is connected to the network (e.g., a link that is not included in a set of links of the provider edge device that is associated with the LAG). Accordingly, the other provider edge device may receive the message from the provider edge device via the network. For example, the other provider edge device may receive the message via a link of the other provider edge device that is connected to the network (e.g., a link that is not included in a set of links of the receiver provider edge device that is associated with the LAG).

As an example, the provider edge device PE 1 may determine an amount of time since a time of receipt of an LACPDU from the customer edge device CE 1 via the set of links $LAG_1$ and determine whether the amount of time is greater than an LACPDU time-out interval (e.g., a time-out interval associated with tearing down links associated with a LAG according to the LACP). When the provider edge device PE 1 determines that the amount of time is greater than the LACPDU time-out interval, the provider edge device PE 1 may determine that the provider edge device PE 1 is not receiving LACPDUs. Alternatively, when the provider edge device PE 1 determines that the amount of time is less than or equal to the LACPDU time-out interval, the provider edge device PE 1 may determine that the provider edge device PE 1 is receiving LACPDUs.

The provider edge device PE 1 may generate a message that includes the LACPDU reception status of the provider edge device PE 1 (e.g., that provider edge device PE 1 is receiving or not receiving LACPDUs). The provider edge device PE 1 may send the message to one or more of provider edge devices PE 1 through PE N. For example, the provider edge device PE 1 may send the message to the provider edge device PE 2 via a link of the provider edge device PE 1 that is not included in the set of links $LAG_1$. The message may propagate through the network and the provider edge device PE 2 may receive the message via a link of the provider edge device PE 2 that is not included in the set of links $LAG_2$.

In some implementations, a message generated and sent by a provider edge device may include additional information, such as an internet protocol (IP) address of the provider edge device, an identifier associated with the LAG, and/or the like. The identifier associated with the LAG may be an Ethernet segment identifier (ESI) associated with the LAG. The provider edge device may process information included in an LACPDU received by the customer edge device CE 1 (e.g., an identifier identifying the customer edge device CE 1, port key information associated with the customer edge device CE 1, and/or the like) to determine the ESI associated with the LAG. Accordingly, each provider edge device associated with the LAG may determine the same ESI for the set of links that connect the provider edge device to the customer edge device CE 1.

Figure 1B:
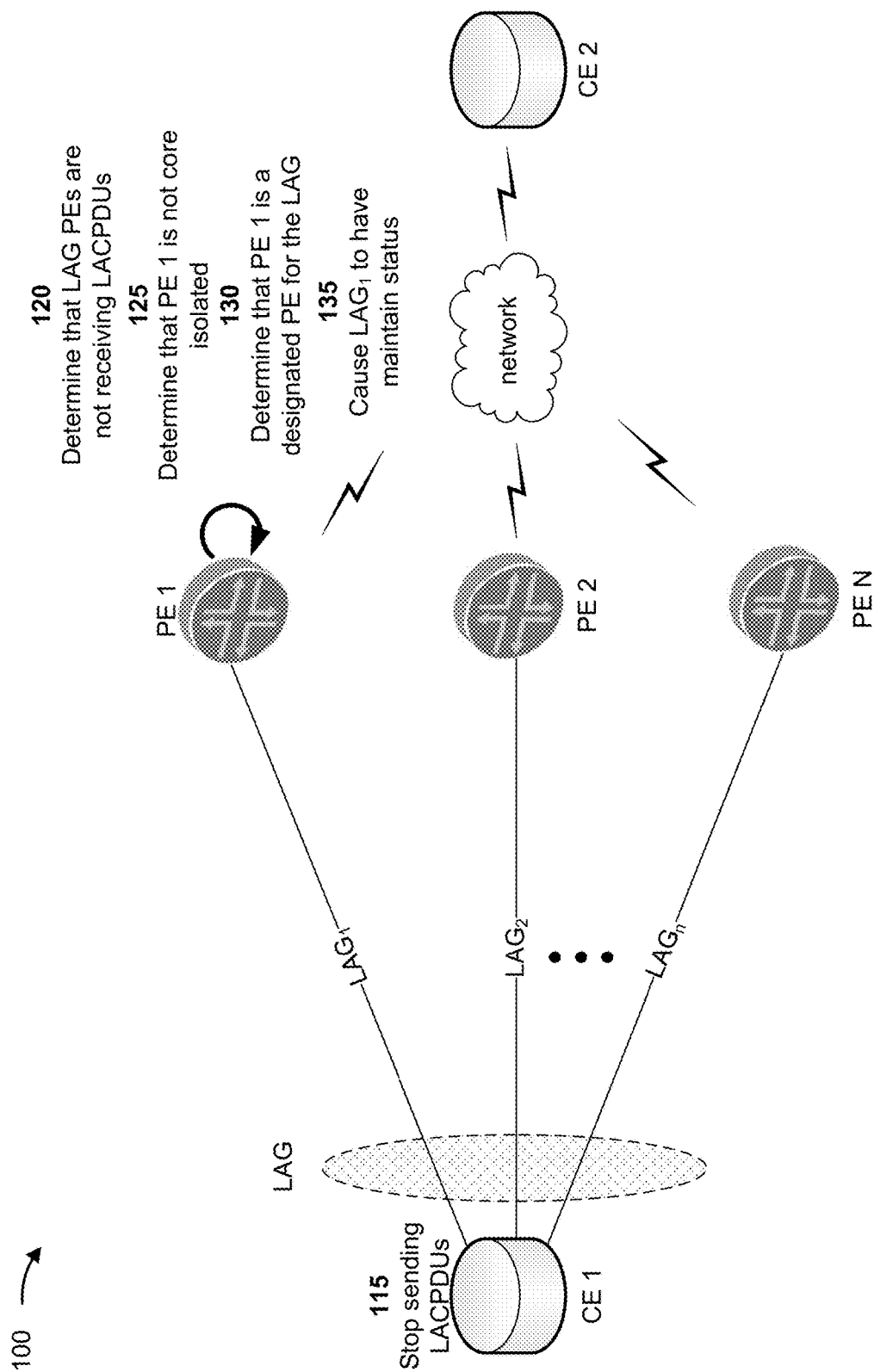

Turning to FIG. 1B, and reference number 115, the customer edge device CE 1 may stop sending LACPDUs. For example, the customer edge device may undergo a customer edge device provisioning process or a customer edge device updating process that requires the customer edge device CE 1 to stop communicating with the provider edge devices PE 1 through PE N for a period of time and/or that requires the customer edge device CE 1 to perform a shutdown and/or reboot sequence. Accordingly, provider edge devices PE 1 through PE N may stop receiving LACPDUs on respective sets of links associated with the LAG. For example, the provider edge device PE 1 may stop receiving LACPDUs via the set of links $LAG_1$, the provider edge device PE 2 may stop receiving LACPDUs via the set of links $LAG_2$, and/or the provider edge device PE 1 may stop receiving LACPDUs via the set of links $LAG_N$.

As further shown in FIG. 1B, and by reference number 120, the provider edge device PE 1 may determine that the provider edge devices PE 1 through PE N are not receiving LACPDUs. In some implementations, the provider edge device PE 1 may determine that the provider edge device PE1 is not receiving LACPDUs from the CE device via the set of links $LAG_1$. For example, the provider edge device PE1 may identify a time of receipt of a last (i.e., most recent) LACPDU received by the provider edge device PE 1 from the customer edge device CE 1 via the set of links $LAG_1$. The provider edge device PE 1 may determine an amount of time since the time of receipt and determine whether the amount of time is greater than an LACPDU time-out interval (e.g., a time-out interval associated with tearing down links associated with a LAG according to the LACP). When the provider edge device PE 1 determines that the amount of time is greater than the LACPDU time-out interval, the provider edge device PE 1 may determine that the provider edge device PE 1 is not receiving LACPDUs from the customer edge device CE 1 via the set of links $LAG_1$.

In some implementations, the provider edge device PE 1 may determine that another provider edge device, of the provider edge devices PE 2 through PE N, is not receiving LACPDUs. For example, the provider edge device PE 1 may receive a message (e.g., as described above in relation to FIG. 1A and reference number 110) from the provider edge device PE 2. The provider edge device PE 1 may process (e.g., parse) the message to identify an LACPDU reception status of the provider edge device PE 2, an ESI associated with the set of links $LAG_2$, an IP address of the provider edge device PE 2, and/or the like. The provider edge device PE 1 may determine that the ESI associated with the set of links $LAG_2$ matches an ESI associated with the set of links $LAG_1$, and may therefore determine that the message is providing information associated with the LAG. Accordingly, when the LACPDU reception status of the provider edge device PE 2 indicates that the provider edge device PE 2 is not receiving LACPDUs, the provider edge device PE 1 may determine that the provider edge device PE 2 is not receiving LACPDUs from the customer edge device CE 1 (e.g., via the set of links $LAG_2$).

As further shown in FIG. 1B, and by reference number 125, the provider edge device PE 1 may determine that the provider edge device PE 1 is not core isolated (e.g., that the provider edge device PE 1 is not disconnected from the network). For example, the provider edge device PE 1 may determine, based on receiving the message from the provider edge device PE 2 (e.g., via a link of the provider edge device PE 1 that is connected to the network), that the provider edge device PE 1 is not core isolated. As another example, the provider edge device PE 1 may monitor the link of the provider edge device PE 1 that is connected to the network to determine whether the provider edge device PE 1 is core isolated. When the provider edge device PE 1 does not detect traffic being transmitted or received by the link, the provider edge device PE 1 may determine that the provider edge device PE 1 is core isolated. The provider edge device PE 1 may therefore allow the set of links $LAG_1$ to be torn down according to the LACP (e.g., when the provider edge device PE 1 is not receiving LACPDUs from the customer edge device CE 1 via the set of links $LAG_1$). Alternatively, when the provider edge device PE 1 detects traffic being transmitted or received by the link, the provider edge device PE 1 may determine that the provider edge device PE 1 is not core isolated. Accordingly, the provider edge device PE 1 may perform one or more of the additional processing steps described herein.

As further shown in FIG. 1B, and by reference number 130, the provider edge device PE 1 may determine that the provider edge device PE 1 is a designated provider edge device for the LAG (e.g., a provider edge device that is to maintain a set of links associated with the LAG to maintain the LAG). For example, the provider edge device PE 1 may identify an IP address of the provider edge device PE 1 (e.g., based on a connection with the network) and/or may identify an IP address of the provider edge device PE 1 (e.g., based on information included in the message provided by the provider edge device PE 2 to the provider edge device PE 1). The provider edge device PE 1 may determine that the IP address of the provider edge device PE 1 is preferable to the IP address of the provider edge device PE 2 (e.g., a value associated with the IP address of the provider edge device PE 1 is lower than a value associated with the IP address of the provider edge device PE 2) and, therefore, may determine that the provider edge device PE 1 is the designated provider. Accordingly, the provider edge device PE 1 may determine that the set of links $LAG_1$ are to be maintained (and that the set of links $LAG_2$ are not to be maintained).

As further shown in FIG. 1B, and by reference number 135, the provider edge device PE 1 may determine that the set of links $LAG_1$ are to be maintained (e.g., based on determining that the provider edge device PE 1 is the designated provider edge device). Accordingly, in some implementations, the provider edge device PE 1 may cause the set of links $LAG_1$ to have a "maintain LAG" status. For example, the provider edge device PE 1 may identify an entry in a data structure that is associated with the LAG (e.g., the same data structure that is described above in relation to FIG. 1A and reference number 105, or a different data structure) that identifies the set of links $LAG_1$ and a status of the set of links $LAG_1$. The provider edge device PE 1 may update the entry to indicate the maintain LAG status for the set of links $LAG_1$.

In some implementations, causing the set of links $LAG_1$ to have the maintain LAG status may cause the provider edge device PE 1 to maintain (e.g., keep up) the set of links $LAG_1$ (e.g., until the set of links $LAG_1$ no longer has the maintain LAG status). For example, when the set of links $LAG_1$ has the maintain LAG status, the provider edge device PE 1 may cease maintaining the set of links according to the LACP (e.g., by preventing the set of links $LAG_1$ from being torn down even though the provider edge device is not receiving LACPDUs from the customer edge device CE 1).

Figure 1C:
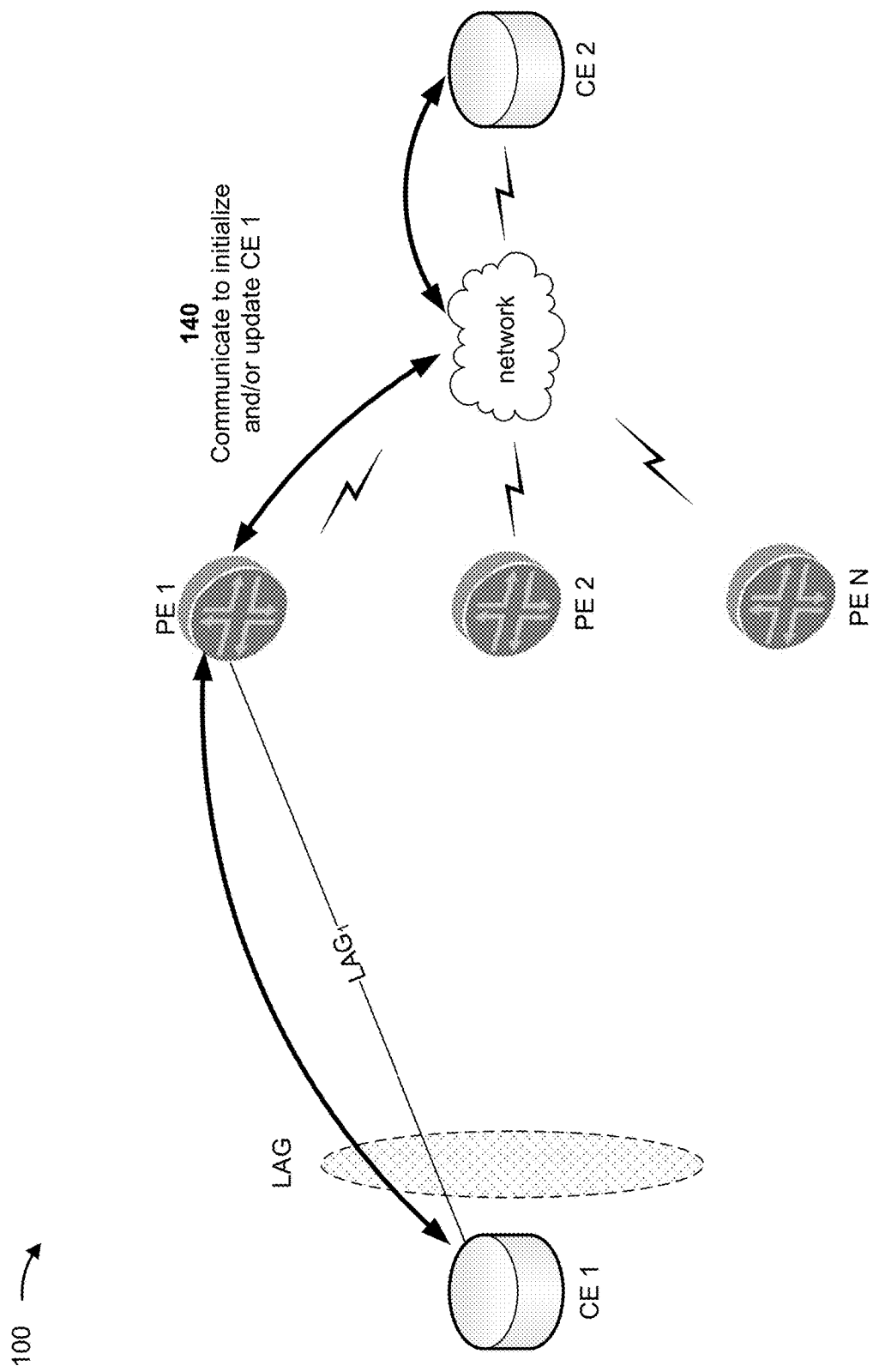

Turning to FIG. 1C, and reference number 140, the customer edge device CE 1 may communicate with the customer edge device CE 2. For example, the customer edge device CE 1 and the customer edge device CE 2 may exchange one or more packets via the set of links $LAG_1$ (e.g., that are being maintained by the provider edge device PE 1), via the provider edge device PE 1, via the link of the provider edge device PE 1 that is connected to the network, via the network, and via a link that connects the customer edge device CE 2 to the network. As further shown in FIG. 1C, the other sets of links that were associated with the LAG (e.g., the sets of links $LAG_2$ through $LAG_N$) and were not assigned a maintain LAG status, were torn down by the provider edge devices PE 2 through PE N according to the LACP (e.g., because the provider edge devices PE 2 through PE N did not receive LACPDUs from the customer edge device CE 1 via the sets of links $LAG_2$ through $LAG_N$). Accordingly, the provider edge device PE 1 may route the one or more packets to or from the customer edge device CE 1 via the set of links $LAG_1$.

The one or more packets may be associated with one or more file images for provisioning or updating the customer edge device CE 1. For example, the provider edge device PE 1 may route one or more packets between the customer edge device CE 1 and the customer edge device CE 2 to allow the customer edge device CE 1 to be provisioned and/or updated with file images provided by the customer edge device CE 2.

Figure 1D:
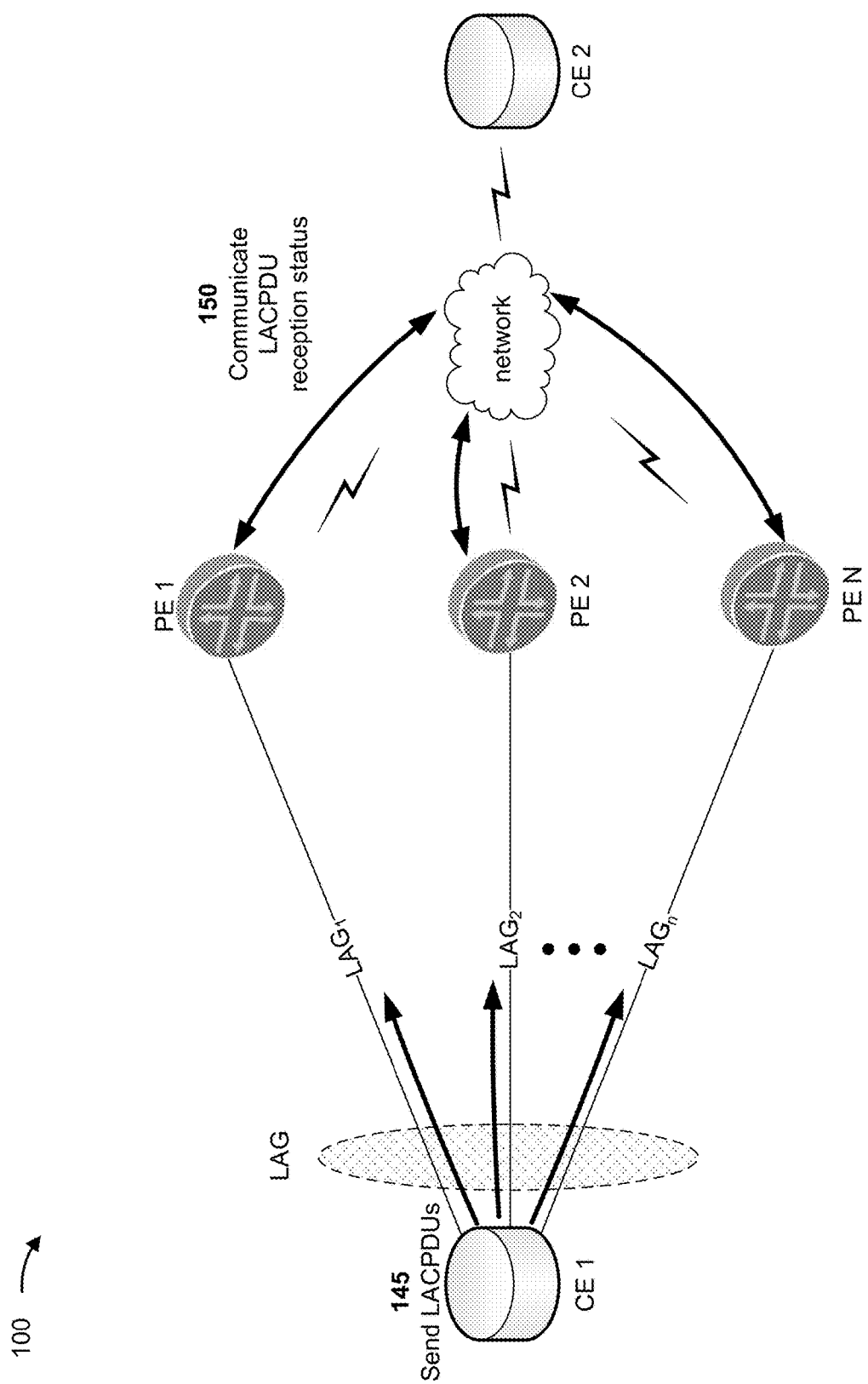

Turning to FIG. 1D, and reference number 145, the customer edge device CE 1 may resume sending LACPDUs via the sets of links that are associated with the LAG. For example, after the customer edge device CE 1 completes the customer edge device provisioning process and/or the customer edge device updating process (e.g., that required the customer edge device CE 1 to perform a shutdown and/or reboot sequence) the customer edge device CE 1 may send LACPDUs on the respective sets of links $LAG_1$ through $LAG_N$ to the provider edge devices PE 1 through PE N (e.g., in a similar manner to that described herein in relation to FIG. 1A and reference number 105). Accordingly, provider edge devices PE 1 through PE N may receive LACPDUs from the customer edge device CE 1 via the sets of links $LAG_1$ through $LAG_N$.

As further shown in FIG. 1D, and by reference number 150, the provider edge devices PE 1 through PE N may communicate with each other to indicate the respective LACPDU reception status of the provider edge devices (e.g., in a similar manner to that described herein in relation to FIG. 1A and reference number 110). For example, the provider edge device PE 1 may generate and send messages to provider edge devices PE 2 through PE N that indicate an LACPDU reception status of the provider edge device PE 1.

Figure 1E:
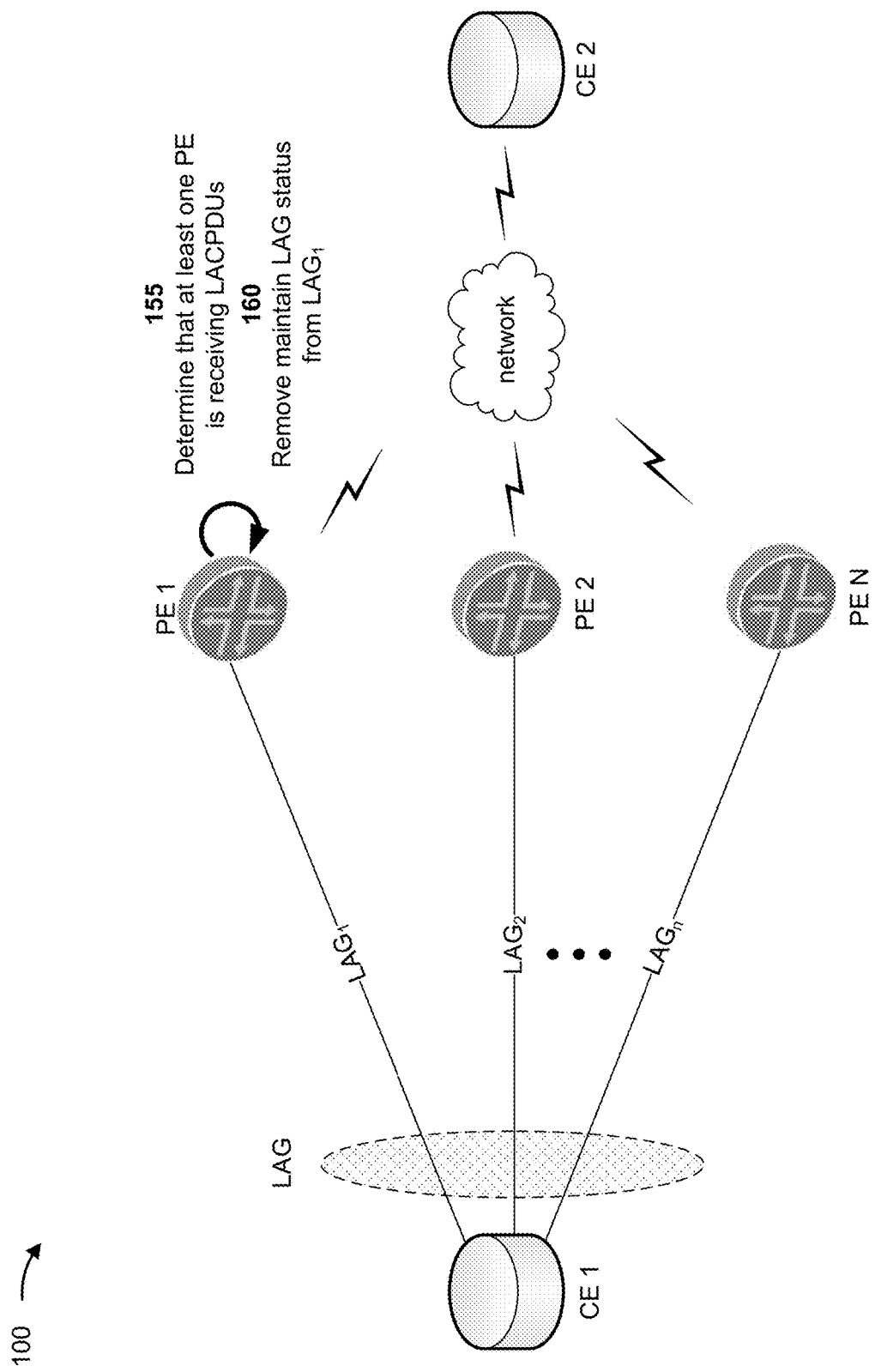

Turning to FIG. 1E, and reference number 155, the provider edge device PE 1 may determine that at least one of the provider edge devices PE 1 through PE N is receiving LACPDUs. In some implementations, the provider edge device PE 1 may determine that the provider edge device PE1 is receiving LACPDUs from the customer edge device CE 1 via the set of links $LAG_1$. For example, the provider edge device PE1 may identify a time of receipt of an LACPDU received by the provider edge device PE 1 from the customer edge device CE 1 via the set of links $LAG_1$ (e.g., that was received by the provider edge device PE 1 after the customer edge device CE 1 resumed sending LACPDUs). The provider edge device PE 1 may determine an amount of time since the time of receipt and determine whether the amount of time is less than or equal to the LACPDU time-out interval. When the provider edge device PE 1 determines that the amount of time is less than or equal to the LACPDU time-out interval, the provider edge device PE 1 may determine that the provider edge device PE 1 is receiving LACPDUs. As another example, the provider edge device PE 1 may receive a number of LACPDUs from the customer edge device CE 1 via the set of links $LAG_1$ (e.g., within a particular time period, such as 10 seconds, 30 seconds, or 60 seconds, among other examples). The provider edge device PE 1 may determine whether the number of LACPDUs satisfies (e.g., is greater than or equal to) a threshold. When the provider edge device PE 1 determines that the number of LACPDUs satisfies the threshold, the provider edge device PE 1 may determine that the provider edge device PE 1 is receiving LACPDUs from the CE device.

In some implementations, the provider edge device PE 1 may determine that another provider edge device, of the provider edge devices PE 2 through PE N, is receiving LACPDUs (e.g., in a similar manner as that described herein in relation to FIG. 1B and reference number 120). For example, the provider edge device PE 1 may receive a message (e.g., as described above in relation to FIG. 1A and reference number 110 and FIG. 1D and reference number 150) from the provider edge device PE 2. The provider edge device PE 1 may determine that the ESI associated with the set of links $LAG_2$ matches an ESI of the set of links $LAG_1$, and may therefore determine that the message is providing information associated with the LAG. Accordingly, when the LACPDU reception status of the provider edge device PE 2 indicates that the provider edge device PE 2 is receiving LACPDUs, the provider edge device PE 1 may determine that the provider edge device PE 2 is receiving LACPDUs from the customer edge device CE 1 (e.g., via the set of links $LAG_2$).

As further shown in FIG. 1E, and by reference number 160, the provider edge device PE 1 may determine that the set of links $LAG_1$ are to cease having the maintain LAG status (e.g., based on determining that at least one of the provider edge devices PE 1 through PE N is receiving LACPDUs from the customer edge device CE 1). Accordingly, in some implementations, the provider edge device PE 1 may cause the set of links $LAG_1$ to cease having the maintain LAG status. For example, the provider edge device PE 1 may identify an entry in the data structure (e.g., that is associated with the LAG) that identifies the set of links $LAG_1$ and a status of the set of links $LAG_1$. The provider edge device PE 1 may update the entry to indicate that the maintain LAG status for the set of links $LAG_1$ has been removed.

In some implementations, causing the set of links $LAG_1$ to cease having the maintain LAG status may cause the provider edge device PE 1 to cease keeping up the set of links $LAG_1$ (e.g., regardless of the condition of customer edge device CE 1). Accordingly, the provider edge device PE 1 may resume maintaining the set of links $LAG_1$ according to the LACP (e.g., keep up the set of links $LAG_1$ while the provider edge device PE 1 receives LACPDUs from the customer edge device CE 1 and/or tear down the set of links $LAG_1$ when the provider edge device PE 1 does not receive LACPDUs from the customer edge device CE 1).

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
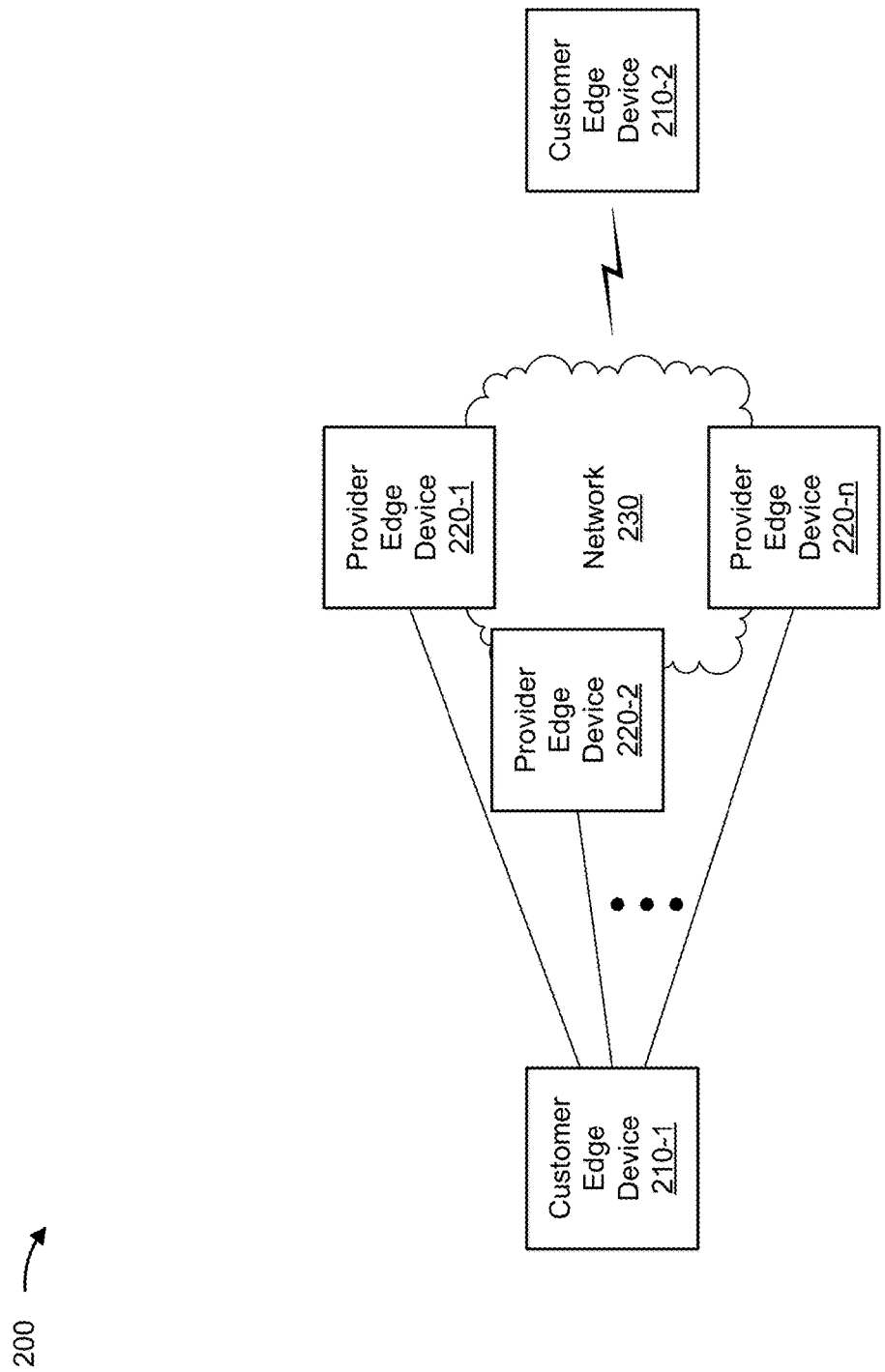
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include customer edge device 210-1 and customer edge device 210-2 (hereinafter referred to collectively as "customer edge devices 210," and individually as "customer edge device 210"); provider edge device 220-1 through provider edge device 220-n (hereinafter referred to collectively as "provider edge devices 220," and individually as "provider edge device 220"); and a network 230. Devices of environment 200 may interconnect via wired connections, wireless connections, or a combination of wired and wireless connections.

Customer edge device 210 includes one or more devices (e.g., one or more traffic transfer devices) capable of processing and/or transferring traffic. For example, customer edge device 210 may include a firewall, a router, a gateway, a switch, a hub, a bridge, a reverse proxy, a server (e.g., a proxy server), a security device, an intrusion detection device, a load balancer, or a similar type of device. In some implementations, customer edge device may be connected to provider edge device 220 via a link, a plurality of links, one or more groups of links, and/or the like, as described elsewhere herein. In some implementations, customer edge device 210 may transmit traffic to provider edge device 220 and receive traffic from provider edge device 220, as described elsewhere herein. In some implementations, customer edge device 210 may be a physical device implemented within a housing, such as a chassis. In some implementations, customer edge device 210 may be a virtual device implemented by one or more computer devices of a cloud computing environment or a data center.

Provider edge device 220 includes one or more devices (e.g., one or more traffic transfer devices) capable of processing and/or transferring traffic. For example, provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, provider edge device 220 may receive traffic from customer edge device 210 and may transmit the traffic to another customer edge device 210, as described elsewhere herein. In some implementations, provider edge device 220 may be a physical device implemented within a housing, such as a chassis. In some implementations, provider edge device 220 may be a virtual device implemented by one or more computer devices of a cloud computing environment or a data center.

Network 230 includes one or more wired and/or wireless networks. For example, network 230 may include a cellular network (e.g., a long-term evolution (LTE) network, a 3G network, a 4G network, a 5G network, a new radio (NR) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an Ethernet network, an Ethernet virtual private network (EVPN), a virtual extensible local area network (VXLAN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
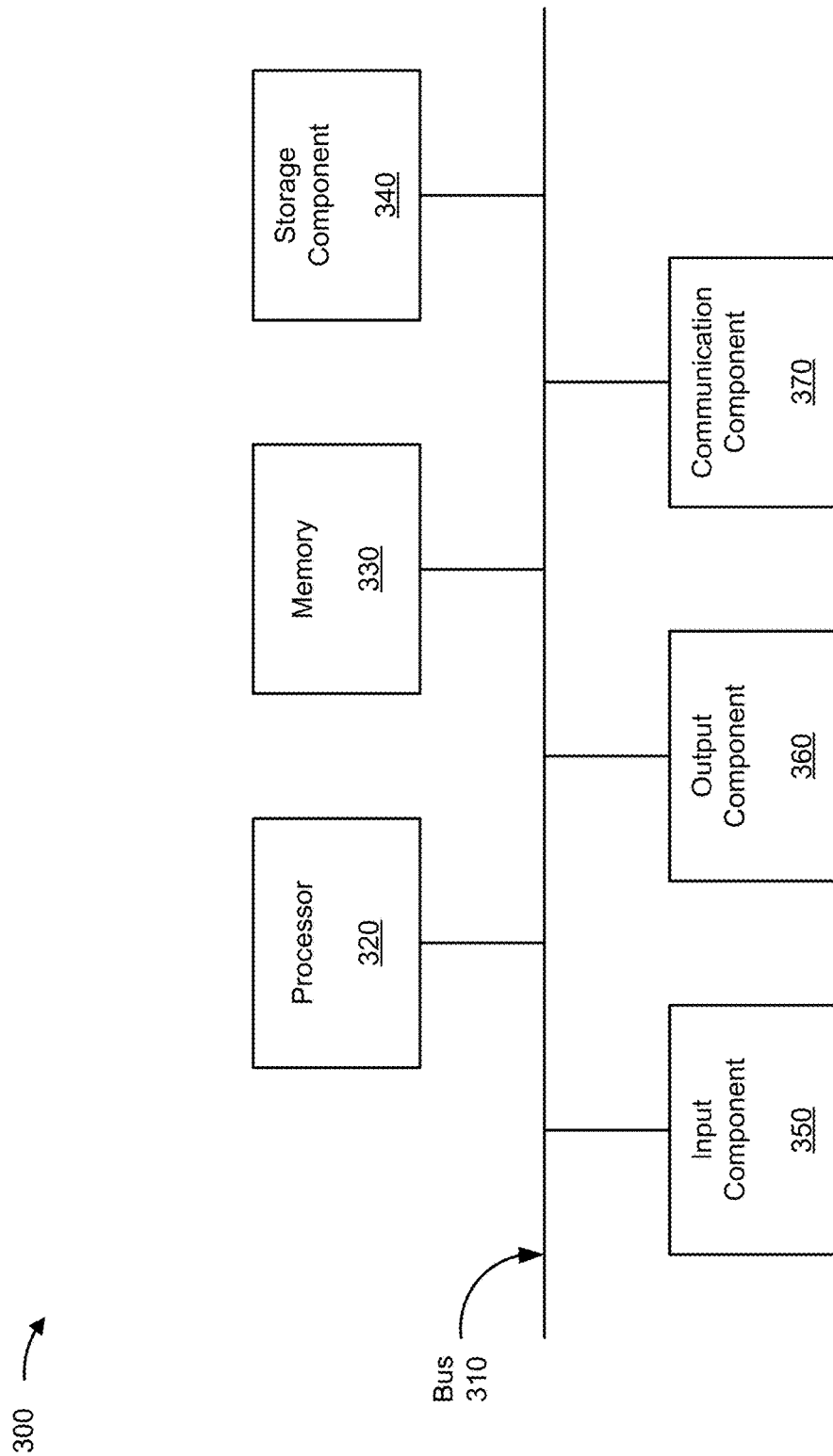
FIGS. 3-4 are diagrams of example components of one or more devices of FIG. 2.

FIG. 3 is a diagram of example components of a device 300, which may correspond to customer edge device 210 and/or provider edge device 220. In some implementations, customer edge device 210 and/or provider edge device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
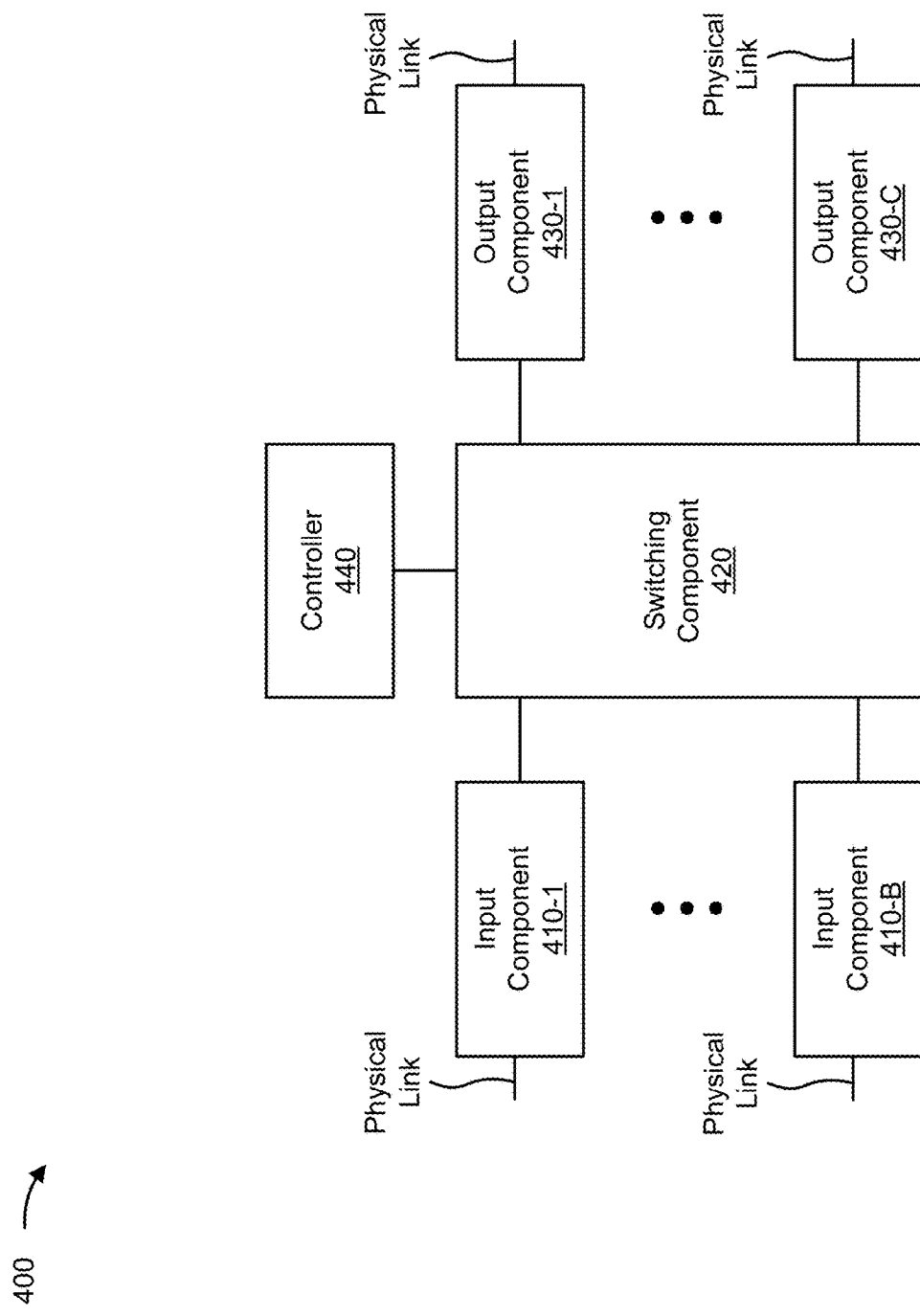

FIG. 4 is a diagram of example components of a device 400. Device 400 may correspond to customer edge device 210 and/or provider edge device 220. In some implementations, customer edge device 210 and/or provider edge device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with maintaining a set of links associated with a LAG to facilitate provisioning or updating of a customer edge device. In some implementations, one or more process blocks of FIG. 5 may be performed by a provider edge device (e.g., provider edge device 220). The provider edge device may be associated with a LAG. In some implementations, one or more process blocks of FIG. 5 may be performed by another device or a group of devices separate from or including the provider edge device, such as a customer edge device (e.g., customer edge device 210). Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 5, process 500 may include maintaining, according to an LACP, a set of links that connect the provider edge device to a consumer edge device associated with the LAG (block 510). For example, the provider edge device may maintain, according to an LACP, a set of links that connect the provider edge device to a consumer edge device associated with the LAG, as described above.

As further shown in FIG. 5, process 500 may include determining that the provider edge device is not receiving LACPDUs from the consumer edge device via the set of links (block 520). For example, the provider edge device may determine that the provider edge device is not receiving LACPDUs from the consumer edge device via the set of links, as described above.

As further shown in FIG. 5, process 500 may include receiving a message from another provider edge device associated with the LAG (block 530). For example, the provider edge device may receive a message from another provider edge device associated with the LAG, as described above.

As further shown in FIG. 5, process 500 may include processing the message to determine that the other provider edge device is not receiving LACPDUs from the consumer edge device (block 540). For example, the provider edge device may process the message to determine that the other provider edge device is not receiving LACPDUs from the consumer edge device, as described above.

As further shown in FIG. 5, process 500 may include causing, based on determining that the provider edge device is not receiving LACPDUs from the consumer edge device and determining that the other provider edge device is not receiving LACPDUs from the consumer edge device, the set of links to have a maintain LAG status (block 550). For example, the provider edge device may cause, based on determining that the provider edge device is not receiving LACPDUs from the consumer edge device and determining that the other provider edge device is not receiving LACP-DUs from the consumer edge device, the set of links to have a maintain LAG status, as described above. In some implementations, causing the set of links to have the maintain LAG status causes the provider edge device to keep up the set of links and to cease maintaining the set of links according to the LACP.

As further shown in FIG. 5, process 500 may include routing, based on causing the set of links to have the maintain LAG status, one or more packets to or from the consumer edge device via the set of links (block 560). For example, the provider edge device may route, based on causing the set of links to have the maintain LAG status, one or more packets to or from the consumer edge device via the set of links, as described above.

Process 500 may include additional implementations, such as any single implementation or any combination of implementations described below and/or in connection with one or more other processes described elsewhere herein.

In a first implementation, the message is an Ethernet segment route message that indicates an LACPDU reception status of the other provider edge.

In a second implementation, alone or in combination with the first implementation, determining that the provider edge device is not receiving LACPDUs from the consumer edge device via the set of links comprises identifying a time of receipt of a last LACPDU received by the provider edge device from the consumer edge device via the set of links, determining an amount of time since the time of receipt, and determining that the amount of time is greater than an LACPDU time-out interval.

In a third implementation, alone or in combination with one or more of the first and second implementations, causing the set of links to have the maintain LAG status comprises determining, based on receiving the message, that the provider edge device is not core isolated, identifying, based on determining that the provider edge device is not core isolated, an Internet protocol (IP) address of the provider edge device and an IP address of the other provider edge device, determining, based on the IP address of the provider edge device and the IP address of the other provider edge device, that the set of links are to be maintained, and updating an entry of a data structure associated with the LAG that indicates a status of the set of links to indicate the maintain LAG status for the set of links.

In a fourth implementation, alone or in combination with one or more of the first through third implementations, causing the set of links to have the maintain LAG status comprises identifying an entry in a data structure associated with the LAG, wherein the entry identifies the set of links and a status of the set of links, and updating the entry of the data structure to indicate the maintain LAG status for the set of links.

In a fifth implementation, alone or in combination with one or more of the first through fourth implementations, process 500 includes determining, by the provider edge device and after routing the one or more packets to or from the consumer edge device via the set of links, that the provider edge device or the other provider edge device is receiving LACPDUs from the consumer edge device, and causing, by the provider edge device and based on determining that the provider edge device or the other provider edge device is receiving LACPDUs from the consumer edge device, the set of links to cease having the maintain LAG status, wherein causing the set of links to cease having the maintain LAG status causes the provider edge device to cease keeping up the set of links and to maintain the set of links according to the LACP.

In a sixth implementation, alone or in combination with one or more of the first through fifth implementations, causing the set of links to cease having the maintain LAG status comprises identifying an entry in a data structure associated with the LAG, wherein the entry identifies the set of links and the maintain LAG status for the set of links, and updating the entry of the data structure to remove the maintain LAG status for the set of links.

In a seventh implementation, alone or in combination with one or more of the first through sixth implementations, determining that the provider edge device or the other provider edge device is receiving LACPDUs from the consumer edge device comprises receiving a number of LACPDUs from the consumer edge device, determining that the number of LACPDUs satisfies a threshold, and determining, based on determining that the number of LACPDUs satisfies the threshold, that the provider edge device is receiving LACPDUs from the consumer edge device.

In an eighth implementation, alone or in combination with one or more of the first through seventh implementations, determining that the provider edge device or the other provider edge device is receiving LACPDUs from the consumer edge device comprises receiving an additional message associated with the LAG from the other provider edge device, and processing the message to determine that the other provider edge device is receiving LACPDUs from the consumer edge device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
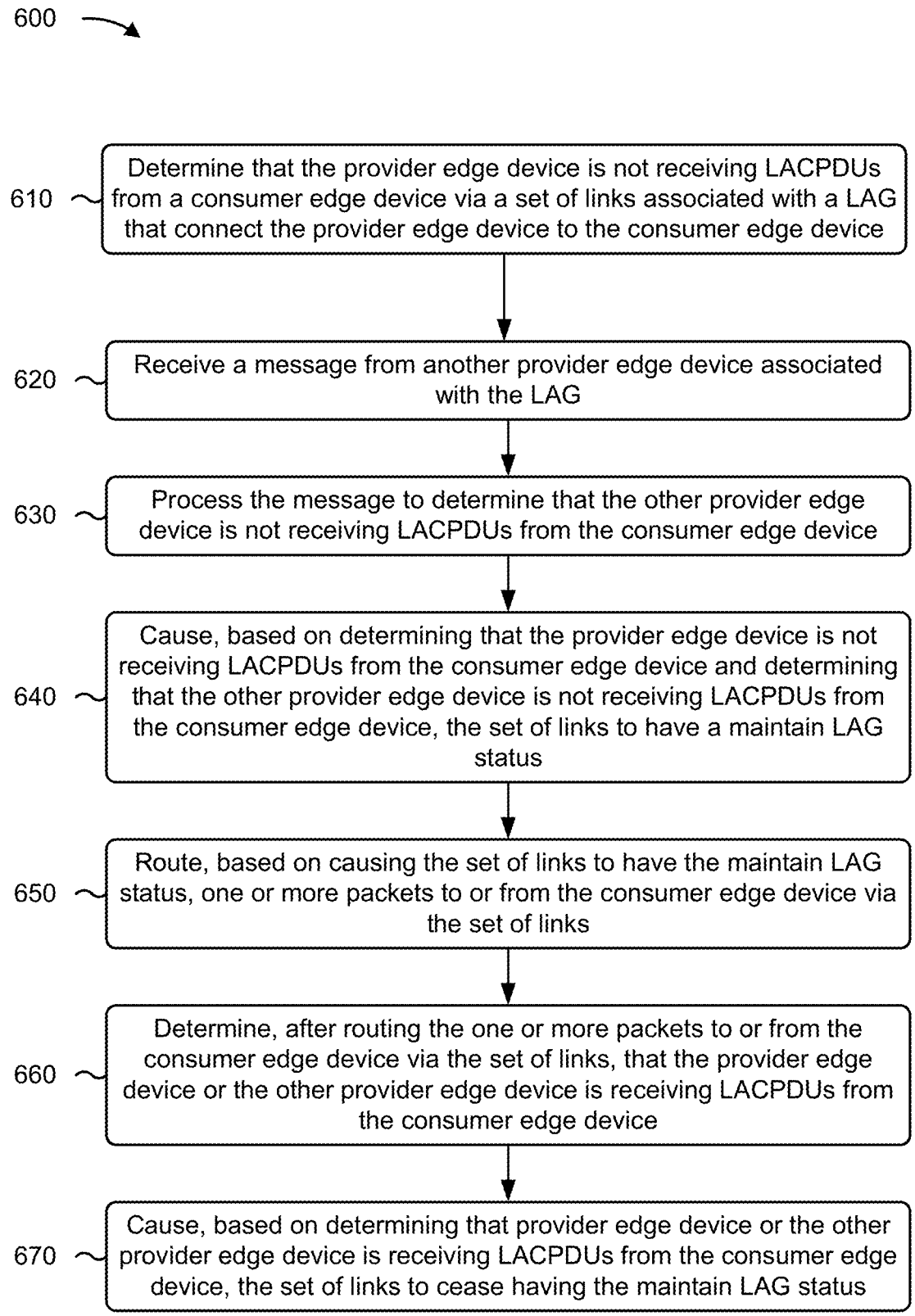

FIG. 6 is a flowchart of an example process 600 associated with maintaining a set of links associated with a LAG to facilitate provisioning or updating of a customer edge device. In some implementations, one or more process blocks of FIG. 6 may be performed by a provider edge device (e.g., provider edge device 220). In some implementations, one or more process blocks of FIG. 6 may be performed by another device or a group of devices separate from or including the provider edge device, such as customer edge device (e.g., customer edge device 210). Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 6, process 600 may include determining that the provider edge device is not receiving LACPDUs from a consumer edge device via a set of links associated with a LAG that connect the provider edge device to the consumer edge device (block 610). For example, the provider edge device may determine that the provider edge device is not receiving LACPDUs from a consumer edge device via a set of links associated with a LAG that connect the provider edge device to the consumer edge device, as described above.

As further shown in FIG. 6, process 600 may include receiving a message from another provider edge device associated with the LAG (block 620). For example, the provider edge device may receive a message from another provider edge device associated with the LAG, as described above.

As further shown in FIG. 6, process 600 may include processing the message to determine that the other provider edge device is not receiving LACPDUs from the consumer edge device (block 630). For example, the provider edge device may process the message to determine that the other provider edge device is not receiving LACPDUs from the consumer edge device, as described above.

As further shown in FIG. 6, process 600 may include causing, based on determining that the provider edge device is not receiving LACPDUs from the consumer edge device and determining that the other provider edge device is not receiving LACPDUs from the consumer edge device, the set of links to have a maintain LAG status (block 640). For example, the provider edge device may cause, based on determining that the provider edge device is not receiving LACPDUs from the consumer edge device and determining that the other provider edge device is not receiving LACP-DUs from the consumer edge device, the set of links to have a maintain LAG status, as described above.

As further shown in FIG. 6, process 600 may include routing, based on causing the set of links to have the maintain LAG status, one or more packets to or from the consumer edge device via the set of links (block 650). For example, the provider edge device may route, based on causing the set of links to have the maintain LAG status, one or more packets to or from the consumer edge device via the set of links, as described above.

As further shown in FIG. 6, process 600 may include determining, after routing the one or more packets to or from the consumer edge device via the set of links, that the provider edge device or the other provider edge device is receiving LACPDUs from the consumer edge device (block 660). For example, the provider edge device may determine, after routing the one or more packets to or from the consumer edge device via the set of links, that the provider edge device or the other provider edge device is receiving LACPDUs from the consumer edge device, as described above.

As further shown in FIG. 6, process 600 may include causing, based on determining that provider edge device or the other provider edge device is receiving LACPDUs from the consumer edge device, the set of links to cease having the maintain LAG status (block 670). For example, the provider edge device may cause, based on determining that provider edge device or the other provider edge device is receiving LACPDUs from the consumer edge device, the set of links to cease having the maintain LAG status, as described above.

Process 600 may include additional implementations, such as any single implementation or any combination of implementations described below and/or in connection with one or more other processes described elsewhere herein.

In a first implementation, the message is received by the provider edge device via a link that is associated with an Ethernet virtual private network (EVPN) and that is not included in the set of links.

In a second implementation, alone or in combination with the first implementation, processing the message to determine that the other provider edge device is not receiving LACPDUs from the consumer edge device includes processing the message to identify an Ethernet segment identifier (ESI) associated with another set of links of the other provider edge device and an LACPDU reception status of the other provider edge device, determining that the ESI associated with the other set of links matches an ESI of the set of links, and determining, after determining that the ESI associated with the other set of links matches the ESI of the set of links, that the other provider edge device is not receiving LACPDUs from the consumer edge device based on the LACPDU reception status of the other provider edge device.

In a third implementation, alone or in combination with one or more of the first and second implementations, causing the set of links to have the maintain LAG status includes determining, based on determining that the provider edge device is not receiving LACPDUs from the consumer edge device and determining that the other provider edge device is not receiving LACPDUs from the consumer edge device, that the consumer edge device is not sending LACPDUs, identifying, based on determining that the consumer edge device is not sending LACPDUs, an IP address of the provider edge device and an IP address of the other provider edge device, determining, based on the IP address of the provider edge device and the IP address of the other provider edge device, that the set of links are to be maintained, and updating an entry of a data structure associated with the LAG that indicates a status of the set of links to indicate the maintain LAG status for the set of links.

In a fourth implementation, alone or in combination with one or more of the first through third implementations, the provider edge device maintained the set of links according to an LACP before causing the set of links to have the maintain LAG status, and causing the set of links to have the maintain LAG status includes causing the set of links to cease being maintained by the provider edge device according to the LACP.

In a fifth implementation, alone or in combination with one or more of the first through fourth implementations, causing the set of links to cease having the maintain LAG status includes causing the set of links to be maintained by the provider edge device according to an LACP.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
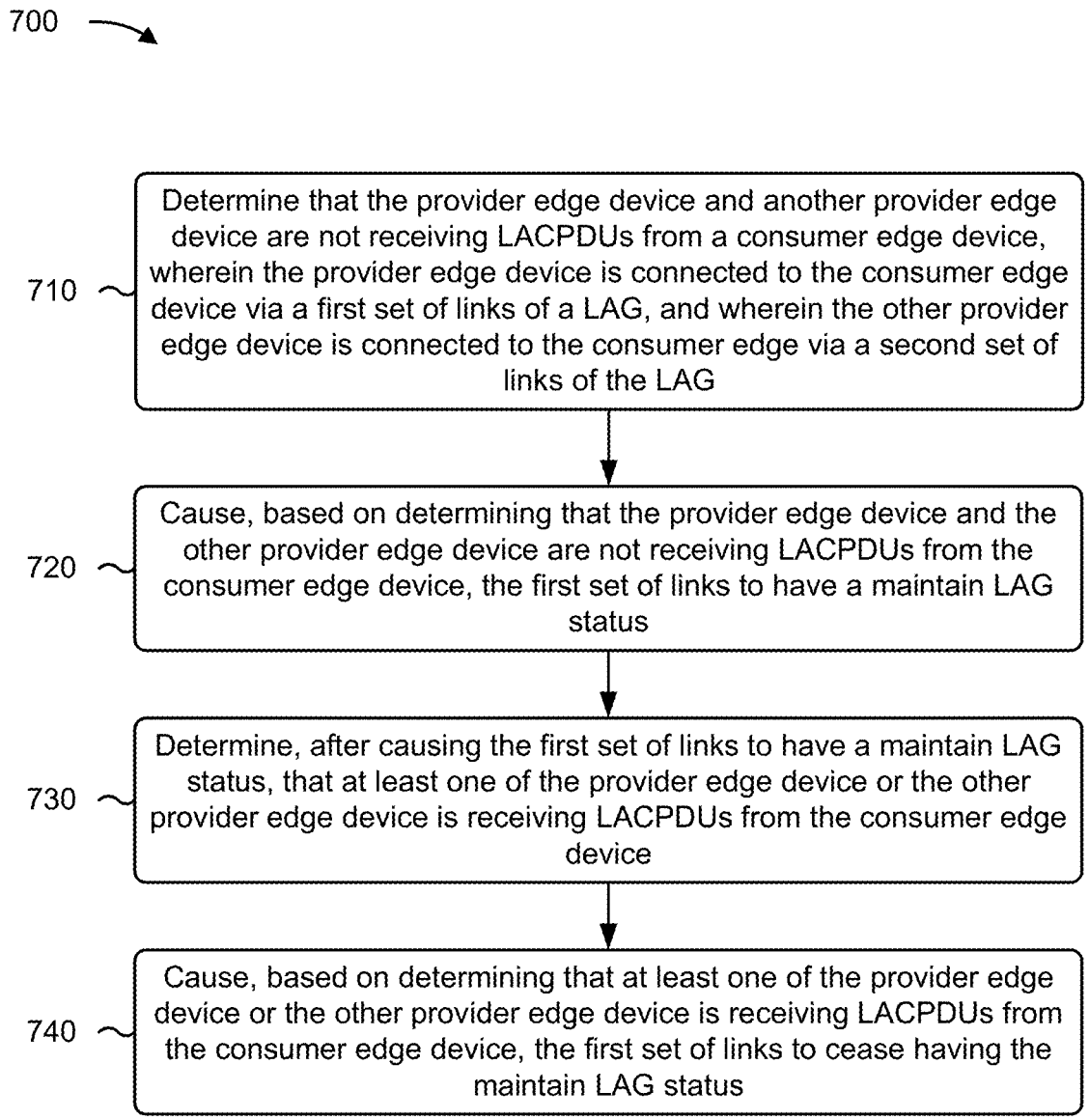

FIG. 7 is a flowchart of an example process 700 associated with maintaining a set of links associated with a LAG to facilitate provisioning or updating of a customer edge device. In some implementations, one or more process blocks of FIG. 7 may be performed by a provider edge device (e.g., provider edge device 220). In some implementations, one or more process blocks of FIG. 7 may be performed by another device or a group of devices separate from or including the provider edge device, such as a customer edge device (e.g., customer edge device 210). Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 7, process 700 may include determining that the provider edge device and another provider edge device are not receiving LACPDUs from a consumer edge device, wherein the provider edge device is connected to the consumer edge device via a first set of links of a LAG, and wherein the other provider edge device is connected to the consumer edge via a second set of links of the LAG (block 710). For example, the provider edge device may determine that the provider edge device and another provider edge device are not receiving LACPDUs from a consumer edge device, wherein the provider edge device is connected to the consumer edge device via a first set of links of a LAG, and wherein the other provider edge device is connected to the consumer edge via a second set of links of the LAG, as described above.

As further shown in FIG. 7, process 700 may include causing, based on determining that the provider edge device and the other provider edge device are not receiving LACPDUs from the consumer edge device, the first set of links to have a maintain LAG status (block 720). For example, the provider edge device may cause, based on determining that the provider edge device and the other provider edge device are not receiving LACPDUs from the consumer edge device, the first set of links to have a maintain LAG status, as described above.

As further shown in FIG. 7, process 700 may include determining, after causing the first set of links to have a maintain LAG status, that at least one of the provider edge device or the other provider edge device is receiving LACPDUs from the consumer edge device (block 730). For example, the provider edge device may determine, after causing the first set of links to have a maintain LAG status, that at least one of the provider edge device or the other provider edge device is receiving LACPDUs from the consumer edge device, as described above.

As further shown in FIG. 7, process 700 may include causing, based on determining that at least one of the provider edge device or the other provider edge device is receiving LACPDUs from the consumer edge device, the first set of links to cease having the maintain LAG status (block 740). For example, the provider edge device may cause, based on determining that at least one of the provider edge device or the other provider edge device is receiving LACPDUs from the consumer edge device, the first set of links to cease having the maintain LAG status, as described above.

Process 700 may include additional implementations, such as any single implementation or any combination of implementations described below and/or in connection with one or more other processes described elsewhere herein.

In a first implementation, determining that the provider edge device and the other provider edge device are not receiving LACPDUs from the consumer edge device includes determining that the provider edge device has not received an LACPDU from the consumer edge via the first set of links for at least a particular amount of time, determining that the particular amount of time is greater than an LACPDU time-out interval, receiving, from the other provider edge device, a message indicating a LACPDU reception status of the other provider edge device, and determining, based on the LACPDU reception status of the message and determining that the particular amount of time is greater than the LACPDU time-out interval, that the provider edge device and the other provider edge device are not receiving LACPDUs from the consumer edge device.

In a second implementation, alone or in combination with the first implementation, causing the first set of links to have the maintain LAG status includes identifying, based on determining that the provider edge device and the other provider edge device are not receiving LACPDUs from the consumer edge device, an IP address of the provider edge device and an IP address of the other provider edge device, determining, based on the IP address of the provider edge device and the IP address of the other provider edge device, that the first set of links are to be maintained and the second set of links are not to be maintained, and updating an entry of a data structure associated with the LAG that indicates a status of the first set of links to indicate the maintain LAG status for the set of links.

In a third implementation, alone or in combination with one or more of the first and second implementations, process 700 includes causing, after causing the first set of links to have the maintain LAG status and before causing the first set of links to cease having the maintain LAG status, the first set of links to be maintained between the provider edge device and the consumer edge device.

In a fourth implementation, alone or in combination with one or more of the first through third implementations, process 700 includes routing, after causing the first set of links to have the maintain LAG status and before causing the first set of links to cease having the maintain LAG status, one or more packets to or from the consumer edge device, wherein the one or more packets are associated with one or more file images for provisioning or updating the consumer edge device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   maintaining, by a provider edge device associated with a link aggregation group (LAG) and according to a link aggregation control protocol (LACP), a set of links that connect the provider edge device to a consumer edge device associated with the LAG;
   determining, by the provider edge device, that the provider edge device is not receiving link aggregation control protocol data units (LACPDUs) from the consumer edge device via the set of links;
   receiving, by the provider edge device, a message from another provider edge device associated with the LAG;
   processing the message to determine that the other provider edge device is not receiving LACPDUs from the consumer edge device;
   causing, by the provider edge device, and based on determining that the provider edge device is not receiving LACPDUs from the consumer edge device and determining that the other provider edge device is not receiving LACPDUs from the consumer edge device, the set of links to have a maintain LAG status,
      wherein causing the set of links to have the maintain LAG status causes the provider edge device to keep up the set of links and to cease maintaining the set of links according to the LACP; and
   routing, by the provider edge device and based on causing the set of links to have the maintain LAG status, one or more packets to or from the consumer edge device via the set of links.

2. The method of claim 1, wherein the message is an Ethernet segment route message that indicates an LACPDU reception status of the other provider edge device.

3. The method of claim 1, wherein determining that the provider edge device is not receiving LACPDUs from the consumer edge device via the set of links comprises:
   identifying a time of receipt of a last LACPDU received by the provider edge device from the consumer edge device via the set of links;
   determining an amount of time since the time of receipt; and
   determining that the amount of time is greater than an LACPDU time-out interval.

4. The method of claim 1, wherein causing the set of links to have the maintain LAG status comprises:
   determining, based on receiving the message, that the provider edge device is not core isolated;
   identifying, based on determining that the provider edge device is not core isolated, an Internet protocol (IP) address of the provider edge device and an IP address of the other provider edge device;
   determining, based on the IP address of the provider edge device and the IP address of the other provider edge device, that the set of links are to be maintained; and
   updating an entry of a data structure associated with the LAG that indicates a status of the set of links to indicate the maintain LAG status for the set of links.

5. The method of claim 1, wherein causing the set of links to have the maintain LAG status comprises:
   identifying an entry in a data structure associated with the LAG,
      wherein the entry identifies the set of links and a status of the set of links; and
   updating the entry of the data structure to indicate the maintain LAG status for the set of links.

6. The method of claim 1, further comprising:
   determining, by the provider edge device and after routing the one or more packets to or from the consumer edge device via the set of links, that the provider edge device or the other provider edge device is receiving LACPDUs from the consumer edge device; and
   causing, by the provider edge device and based on determining that the provider edge device or the other provider edge device is receiving LACPDUs from the consumer edge device, the set of links to cease having the maintain LAG status,
      wherein causing the set of links to cease having the maintain LAG status causes the provider edge device to cease keeping up the set of links and to maintain the set of links according to the LACP.

7. The method of claim 6, wherein causing the set of links to cease having the maintain LAG status comprises:
   identifying an entry in a data structure associated with the LAG,
      wherein the entry identifies the set of links and the maintain LAG status for the set of links; and
   updating the entry of the data structure to remove the maintain LAG status for the set of links.

8. The method of claim 6, wherein determining that the provider edge device or the other provider edge device is receiving LACPDUs from the consumer edge device comprises:
   receiving a number of LACPDUs from the consumer edge device;
   determining that the number of LACPDUs satisfies a threshold; and
   determining, based on determining that the number of LACPDUs satisfies the threshold, that the provider edge device is receiving LACPDUs from the consumer edge device.

9. The method of claim 6, wherein determining that the provider edge device or the other provider edge device is receiving LACPDUs from the consumer edge device comprises:
  receiving an additional message associated with the LAG from the other provider edge device; and
  processing the message to determine that the other provider edge device is receiving LACPDUs from the consumer edge device.

10. A provider edge device, comprising:
  one or more memories; and
  one or more processors to:
    determine that the provider edge device is not receiving link aggregation control protocol data units (LACPDUs) from a consumer edge device via a set of links associated with a link aggregation group (LAG) that connect the provider edge device to the consumer edge device;
    receive a message from another provider edge device associated with the LAG;
    process the message to determine that the other provider edge device is not receiving LACPDUs from the consumer edge device;
    cause, based on determining that the provider edge device is not receiving LACPDUs from the consumer edge device and determining that the other provider edge device is not receiving LACPDUs from the consumer edge device, the set of links to have a maintain LAG status;
    route, based on causing the set of links to have the maintain LAG status, one or more packets to or from the consumer edge device via the set of links;
    determine, after routing the one or more packets to or from the consumer edge device via the set of links, that the provider edge device or the other provider edge device is receiving LACPDUs from the consumer edge device; and
    cause, based on determining that provider edge device or the other provider edge device is receiving LACPDUs from the consumer edge device, the set of links to cease having the maintain LAG status.

11. The provider edge device of claim 10, wherein the message is received by the provider edge device via a link that is associated with an Ethernet virtual private network (EVPN) and that is not included in the set of links.

12. The provider edge device of claim 10, wherein the one or more processors, when processing the message to determine that the other provider edge device is not receiving LACPDUs from the consumer edge device, are to:
  process the message to identify an Ethernet segment identifier (ESI) associated with another set of links of the other provider edge device and an LACPDU reception status of the other provider edge device;
  determine that the ESI associated with the other set of links matches an ESI of the set of links; and
  determine, after determining that the ESI associated with the other set of links matches the ESI of the set of links, that the other provider edge device is not receiving LACPDUs from the consumer edge device based on the LACPDU reception status of the other provider edge device.

13. The provider edge device of claim 10, wherein the one or more processors, when causing the set of links to have the maintain LAG status, are to:
  determine, based on determining that the provider edge device is not receiving LACPDUs from the consumer edge device and determining that the other provider edge device is not receiving LACPDUs from the consumer edge device, that the consumer edge device is not sending LACPDUs;
  identify, based on determining that the consumer edge device is not sending LACPDUs, an Internet protocol (IP) address of the provider edge device and an IP address of the other provider edge device;
  determine, based on the IP address of the provider edge device and the IP address of the other provider edge device, that the set of links are to be maintained; and
  update an entry of a data structure associated with the LAG that indicates a status of the set of links to indicate the maintain LAG status for the set of links.

14. The provider edge device of claim 10, wherein the provider edge device maintained the set of links according to a link aggregation control protocol (LACP) before causing the set of links to have the maintain LAG status, and
  wherein the one or more processors, when causing the set of links to have the maintain LAG status, are to:
    cause the set of links to cease being maintained by the provider edge device according to the LACP.

15. The provider edge device of claim 10, wherein the one or more processors, when causing the set of links to cease having the maintain LAG status, are to:
  cause the set of links to be maintained by the provider edge device according to a link aggregation control protocol (LACP).

16. A non-transitory computer-readable medium storing a set of instructions, the set of instructions comprising:
  one or more instructions that, when executed by one or more processors of a provider edge device, cause the provider edge device to:
    determine that the provider edge device and another provider edge device are not receiving link aggregation control protocol data units (LACPDUs) from a consumer edge device,
      wherein the provider edge device is connected to the consumer edge device via a first set of links of a link aggregation group (LAG), and
      wherein the other provider edge device is connected to the consumer edge via a second set of links of the LAG;
    cause, based on determining that the provider edge device and the other provider edge device are not receiving LACPDUs from the consumer edge device, the first set of links to have a maintain LAG status;
    determine, after causing the first set of links to have a maintain LAG status, that at least one of the provider edge device or the other provider edge device is receiving LACPDUs from the consumer edge device; and
    cause, based on determining that at least one of the provider edge device or the other provider edge device is receiving LACPDUs from the consumer edge device, the first set of links to cease having the maintain LAG status.

17. The non-transitory computer-readable medium of claim 16, wherein the one or more instructions, that cause determining that the provider edge device and the other provider edge device are not receiving LACPDUs from the consumer edge device, cause the provider edge device to:
  determine that the provider edge device has not received an LACPDU from the consumer edge via the first set of links for at least a particular amount of time;
  determine that the particular amount of time is greater than an LACPDU time-out interval;

receive, from the other provider edge device, a message indicating a LACPDU reception status of the other provider edge device; and determine, based on the LACPDU reception status of the message and determining that the particular amount of time is greater than the LACPDU time-out interval, that the provider edge device and the other provider edge device are not receiving LACPDUs from the consumer edge device.

18. The non-transitory computer-readable medium of claim 16, wherein the one or more instructions, that cause the provider edge device to cause the first set of links to have the maintain LAG status, cause the provider edge device to:

identify, based on determining that the provider edge device and the other provider edge device are not receiving LACPDUs from the consumer edge device, an Internet protocol (IP) address of the provider edge device and an IP address of the other provider edge device;

determine, based on the IP address of the provider edge device and the IP address of the other provider edge device, that the first set of links are to be maintained and the second set of links are not to be maintained; and update an entry of a data structure associated with the LAG that indicates a status of the first set of links to indicate the maintain LAG status for the set of links.

19. The non-transitory computer-readable medium of claim 16, wherein the one or more instructions, when executed by the one or more processors, further cause the provider edge device to:

cause, after causing the first set of links to have the maintain LAG status and before causing the first set of links to cease having the maintain LAG status, the first set of links to be maintained between the provider edge device and the consumer edge device.

20. The non-transitory computer-readable medium of claim 16, wherein the one or more instructions, when executed by the one or more processors, further cause the provider edge device to:

route, after causing the first set of links to have the maintain LAG status and before causing the first set of links to cease having the maintain LAG status, one or more packets to or from the consumer edge device, wherein the one or more packets are associated with one or more file images for provisioning or updating the consumer edge device.

\* \* \* \* \*